(12) United States Patent
Monden et al.

(10) Patent No.: US 8,121,066 B2
(45) Date of Patent: Feb. 21, 2012

(54) RADIO NETWORK EXPANSION METHOD

(75) Inventors: Kazuya Monden, Yokohama (JP);
Tomoichi Ebata, Sagamihara (JP);
Susumu Matsui, Machida (JP);
Tatsuaki Osafune, Cannes (FR)

(73) Assignee: Hitachi, Ltd., Tokyo (JP)

( * ) Notice: Subject to any disclaimer, the term of this patent is extended or adjusted under 35 U.S.C. 154(b) by 641 days.

(21) Appl. No.: 12/250,747

(22) Filed: Oct. 14, 2008

(65) Prior Publication Data

US 2009/0052368 A1 Feb. 26, 2009

Related U.S. Application Data

(62) Division of application No. 11/038,059, filed on Jan. 21, 2005, now abandoned.

(30) Foreign Application Priority Data

Jan. 30, 2004 (JP) .................................. 2004-022462

(51) Int. Cl.
*H04B 7/14* (2006.01)
(52) U.S. Cl. ......... 370/315; 370/252; 370/338; 455/446
(58) Field of Classification Search ........................ None
See application file for complete search history.

(56) References Cited

U.S. PATENT DOCUMENTS

| 5,450,613 | A | | 9/1995 | Takahara et al. | |
|---|---|---|---|---|---|
| 5,801,639 | A | * | 9/1998 | Dorenbosch et al. | ........ 340/7.23 |
| 2002/0049060 | A1 | | 4/2002 | Grob et al. | |
| 2002/0085503 | A1 | * | 7/2002 | Hulyalkar et al. | ............ 370/252 |
| 2004/0246934 | A1 | * | 12/2004 | Kim | .............................. 370/338 |

FOREIGN PATENT DOCUMENTS

JP 2000-004469 1/2000

* cited by examiner

*Primary Examiner* — Ricky Ngo
*Assistant Examiner* — David Oveissi
(74) *Attorney, Agent, or Firm* — Mattingly & Malur, PC

(57) ABSTRACT

One objective of the present invention is to determine a location for a relay terminal in a radio network, without preparatory surveying a radio status, and to arrange the relay terminal at the location. Another objective is to provide a method for retrieving the arranged relay terminal. When a relay terminal is to be arranged, the relay terminal transmits a survey packet to examine the quality of communication with a communication terminal or other relay terminal. Where a location is appropriate, the relay terminal gives a notice. The arranged terminal relays communication. Further, when the relay terminal is to be retrieved, the relay terminal carried by a user transmits a retrieval packet to the arranged relay terminal, which notifies the user of its presence by light, sounds, or returning a packet. In this manner, a single relay terminal provides functions of arrangement, relay and retrieval.

10 Claims, 9 Drawing Sheets

FIG.3
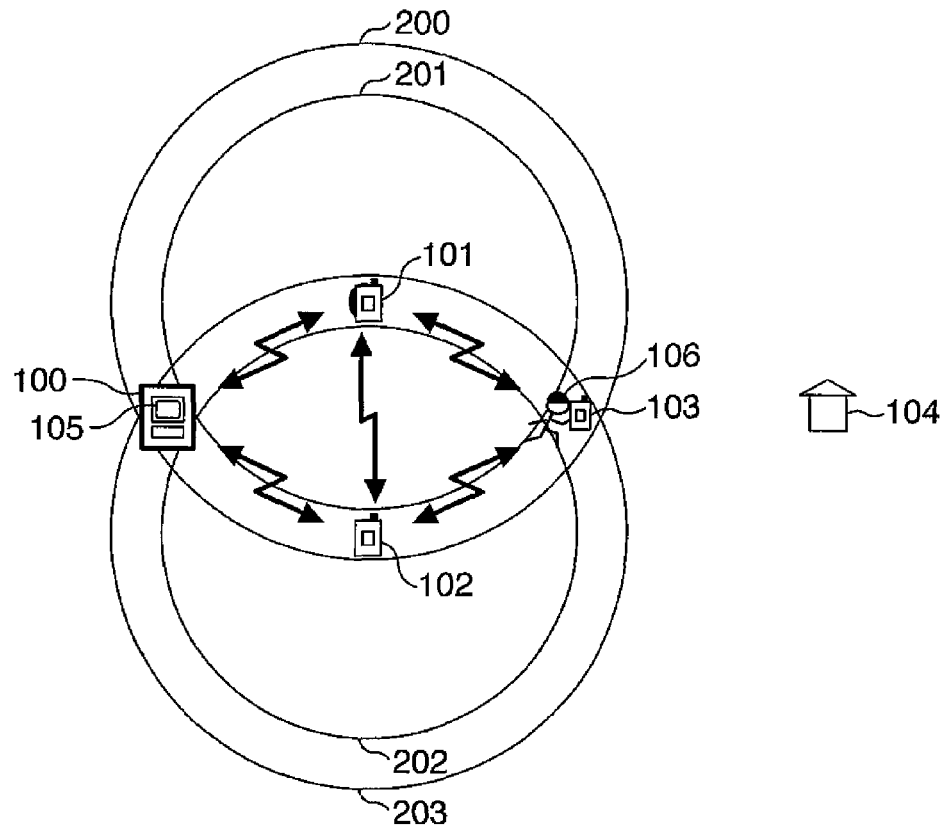
FIG.7
| PACKET TYPE: SURVEY | OBJECT TERMINAL: ID | TRANSMISSION SOURCE: ID |
|---|---|---|
| 500 | 501 | 502 |
FIG.8
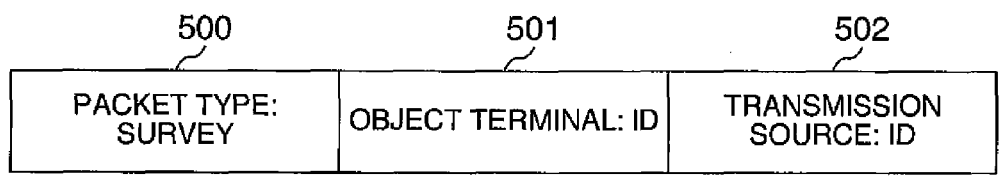
|  | ACCESSIBLE RELAY TERMINAL ID (703) | COMMUNICATION QUALITY (704) |  |
|---|---|---|---|
| 700 | RELAY TERMINAL 101 ID | L2 | 705 |
| 701 | RELAY TERMINAL 102 ID | L2 | 706 |
|  | ... | ... |  |

RADIO NETWORK EXPANSION METHOD

This is a divisional application of U.S. Ser. No. 11/038,059, filed Jan. 21, 2005 now abandoned, the contents of which are incorporated herein by reference.

INCORPORATION BY REFERENCE

This application claims priority based on a Japanese patent application, No. 2004-022462 filed on Jan. 30, 2004, the entire contents of which are incorporated herein by reference.

BACKGROUND OF THE INVENTION

The present invention relates to an expansion method for a radio network having communication terminals and a relay terminal and a support method therefore, and also relates to the communication terminals and the relay terminal.

To extend the communication range of a radio network, a presently available method requires that a relay terminal be positioned between a communication terminal and a base station. But generally, when this method is employed, a radio wave status survey must be performed in advance, to ensure that the relay terminal is properly positioned and that a desired communication quality is obtained. According to another method, however, the performance of a preparatory radio wave status survey is not required. With this method, in order to determine the location of a relay terminal that relays a communication terminal and a base station, an adjustment signal is transmitted by the base station (see, e.g., Japanese Laid Open Patent Publication No. 2000-4469).

SUMMARY OF THE INVENTION

These conventional techniques, however, do not take into consideration the method by which the location of a relay terminal should be determined, and how to position the relay terminal cannot easily be determined without a survey of the wave status being performed.

Furthermore, the redundancy relative to the halting of the function of a relay terminal is not taken into account, and communication would be cut off due to the halting of the function of the relay terminal.

In addition, a method for retrieving a thus arranged relay terminal is not considered.

The present invention enables the arrangement of a relay terminal without performing a preparatory survey of a radio wave status. Also, a support function for retrieving the thus arranged relay terminal is provided.

According to the present invention, in a radio network having communication terminals that transmit or receive data and relay terminals that relay data, each relay terminal transmits a packet to detect the presence of a communication terminal relative to the current location of the relay terminal, or the presence of another relay terminal that can relay communications for the communication terminal, and to examine communication quality, so that the relay terminal can locate a site that can relay communications for the communication terminal.

The relay terminal employs light or sound to indicate that the current location is an appropriate one for relaying communications for the communication terminal.

The relay terminal includes a communication quality evaluation unit for determining whether the current location is an appropriate one for relaying communications for the communication terminal.

Further, provided is a method whereby, in order to prevent the cutting off of communications for communication terminals, the relay terminal is located so that it can communicate with at least two communication terminals or with another relay terminal that can communicate with the communication terminals.

Furthermore, in order to retrieve relay terminals that have been located, a relay terminal used to support the collection transmits packets to relay terminals in order to determine whether they are within radio communication range, and relay terminals that receive these packets verify their presence by employing lights or sounds or by returning the packets.

The relay terminals have arrangement, relaying and retrieval functions, and these functions can be switched so that all of them can be provided by a single terminal.

According to the present invention, the arrangement and/or collection of relay terminals used in a radio network is enabled.

These and other benefits are described throughout the present specification. A further understanding of the nature and advantages of the invention may be realized by reference to the remaining portions of the specification and the attached drawings.

BRIEF DESCRIPTION OF THE DRAWINGS

FIG. 3 is a diagram exemplifying an appropriate location according to the embodiment wherein a relay terminal that can communicate with two or more terminals is arranged.

FIG. 7 is a diagram exemplifying the format of a survey packet according to the embodiment.

FIG. 8 is a diagram exemplifying an object terminal accessible list according to the embodiment.

DESCRIPTION OF THE EMBODIMENTS

Figure 1:
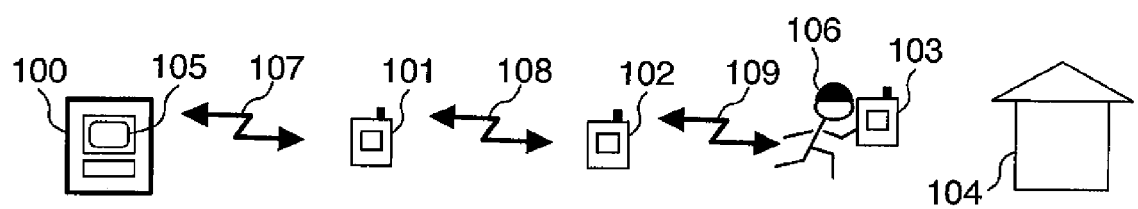
FIG. 1 is a diagram exemplifying the procedures of an operation according to one embodiment of the present invention.

The embodiment of the present invention will now be described while referring to the drawings.

FIG. 1 is a diagram showing a radio network expansion method according to the embodiment of the present invention. A communication terminal 105 is located in a supervisory hub 100, and a supervisory target 104 is located outside the radio transmission range (the communication range) of the communication terminal 105. A relay terminal 101 is located between the supervisory hub 100 and the supervisory target 104, and within the radio transmission range (the communication range) of the communication terminal 105, and a relay terminal 102 is located between the supervisory target 104 and the relay terminal 101 and within the radio transmission range of the communication terminal 101. A supervisory person 106, having a communication terminal 103, is located where he or she can communicate with the relay terminal 102. Communication between the communication terminal 105 and the relay terminal 101 is indicated by an arrow 107, communication between the relay terminal 101 and the relay terminal 102 is indicted by an arrow 108, and communication between the relay terminal 102 and the communication terminal 103 (supervisory person 106) is indicated by an arrow 109.

Hereinafter, when communication terminals and relay terminals are not specified, they are referred to simply as terminals.

The method of the embodiment for arranging the relay terminal will now be described.

When an abnormality occurs at the supervisory target 104, the supervisory person 106 is supposed to be dispatched from the supervisory hub 100 to examine the abnormality. However, since the supervisory target 104 is outside the radio transmission range of the communication terminal 105, which is located in the supervisory hub 100, upon arriving at the supervisory target 104, the supervisory person 106 could not employ the communication terminal 103 to communicate with the communication terminal 105.

Therefore, upon departing the supervisory hub 100, the supervisory person 106 carries the relay terminal 101, the relay terminal 102 and the communication terminal 103. When the supervisory person 106 arrives at a location, distant from the supervisory hub 100, where the quality of the radio communication with the communication terminal 105 reaches a predetermined reference level, the arrangement of the relay terminal 101 is requested of and is performed by the supervisory person 106.

Similarly, when the supervisory person 106 arrives at a location, distant from the relay terminal 101, where the quality of communication with the relay terminal 101 reaches the reference level, the arrangement of the relay terminal 102 is requested of and is performed by the supervisory person 106. In this manner, the radio network is extended for the communication terminal 105 and the communication terminal 103 carried by the supervisory person 106.

To establish the radio communication route for the expansion of the radio network, a route control method, the standardization of which has been discussed by the IETF (Internet Engineering Task Force), can be employed for a mobile ad hoc network. In this embodiment, it is assumed that route control software is supplied for the terminals and is employed for route control.

Initially, the route control software for the communication terminal 105 is activated, while the route control software for each of the relay terminals 101 and 102 is activated once the terminal has been arranged. A communication route is then provided when a communication request from one of the communication terminals is received.

A redundancy may be provided for a radio network so that when a malfunction occurs, due to a failure at or the destruction of a relay terminal, or a shortage of batteries, the cutting off of the radio network can be prevented. In this case, each relay terminal may have a function for so arranging itself that it can be connected to at least two other terminals.

Figure 2:
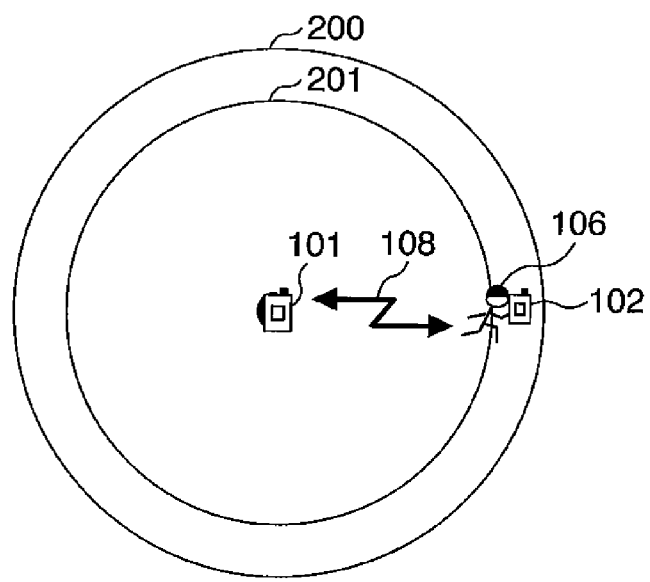
FIG. 2 is a diagram exemplifying an appropriate location according to the embodiment wherein a relay terminal is arranged.

While referring to FIG. 2, an explanation will be given for a method for determining an appropriate location for the arrangement of a relay terminal. The quality of the communication with the terminal 101 is shown in FIG. 2. Circles 201 and 200 are used to describe the communication quality boundaries: within the inner circle 201, the communication quality is high; in the area delimited by the circle 200 and the circle 201, the communication quality is intermediate; and beyond the outer circle 200, either the communication quality is low or the range for radio communication is exceeded.

The communication quality is measured as an electric field relative to the terminal 101, or a signal-to-noise ratio, and a reference value indicating a border is determined in advance. When the supervisory person 106 carrying the relay terminal 102 enters the range delimited by the circles 201 and 200, wherein the radio communication quality is "intermediate", it is determined that the location is appropriate for the relay terminal 102.

While referring to FIG. 3, an explanation will be given for a method for determining a location, appropriate for the relay terminal 103, whereat communication with at least two terminals is possible. Circles 202 and 203 describe the boundaries for the quality of communication with the terminal 102. When the supervisory person 106 carrying the relay terminal 103 enters an area defined by the circles 200 and 203 and excluding areas delimited by the circles 201 and 202, i.e., enters an area in which the quality of communication, with two or more terminals, is "intermediate", but that excludes areas in which the quality of communication, with two or more terminals, is "high", it is determined that the relay terminal 103 is appropriately located for communicating with the two relay terminals 101 and 102 at least.

Figure 16:
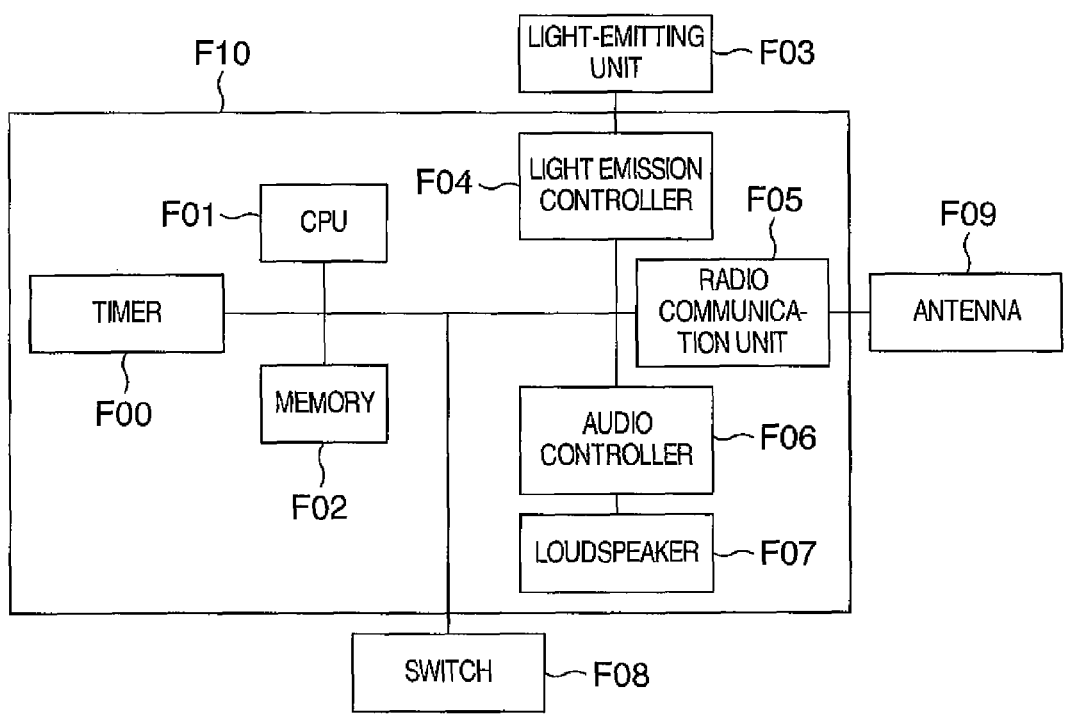
FIG. 16 is a diagram exemplifying the configuration of a relay terminal according to the embodiment.

An explanation will now be given for a relay terminal. First, an example configuration for a relay terminal will be described while referring to FIG. 16. A relay terminal F10 includes a CPU F01, a memory F02, a timer F00, a radio communication unit F05, a light emission controller F04, an audio controller F06 and a switch F08. An antenna F09 is connected to the radio communication unit F05, a light-emitting unit F03 is connected to the light emission controller F04, and a loudspeaker F07 is connected to the audio controller F06.

The antenna F09 is used by the relay terminal F10 to relay packets. The light-emitting unit F03 in this embodiment can emit light in four colors and can turn light on or blink it, and can change the blinking speed. Sounds can be produced by the loudspeaker F07.

The relay terminal F10 has three functions: a terminal arrangement support function G00, used for the arrangement of the relay terminal; a relay function G01, for relaying a packet after the relay terminal has been arranged; and a terminal collection support function G02, for retrieving the arranged terminal.

Figure 17:
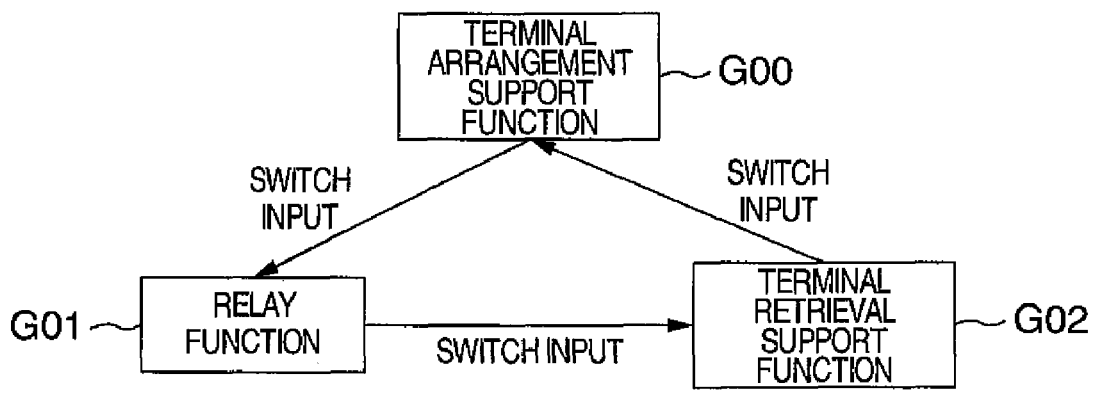
FIG. 17 is a diagram exemplifying the shifting of the function state according to the embodiment.

The relay terminal F10 selectively performs one of the three functions. The functions can be changed by depressing the switch F08, as is shown in FIG. 17. In this embodiment, the terminal arrangement support function C00, the relay function G01 and the terminal retrieval function G02 of the relay terminal F10 are sequentially altered by depressing the switch F08. The currently selected relay terminal F10 function can be identified from the color of the light emitted by the light-emitting unit F03.

Various lists, which will be described later, and the ID of a terminal at a communication object are stored in the memory F02. The timer F00 measures a wait time for determining a time-out for each packet, which will be described later. A corresponding wait time is registered in advance for each type of packet.

The functions explained in this embodiment are performed when the CPU F01 of a terminal executes programs stored in the memory F02. At least part of each function may be performed by hardware.

The programs may be stored in the memory F02 in advance, or may be downloaded to the memory F02, as needed, from a detachable recording medium or a communication medium (a communication network including a radio network or a carrier along a communication network) that can be accessed by the terminal.

Figure 4:
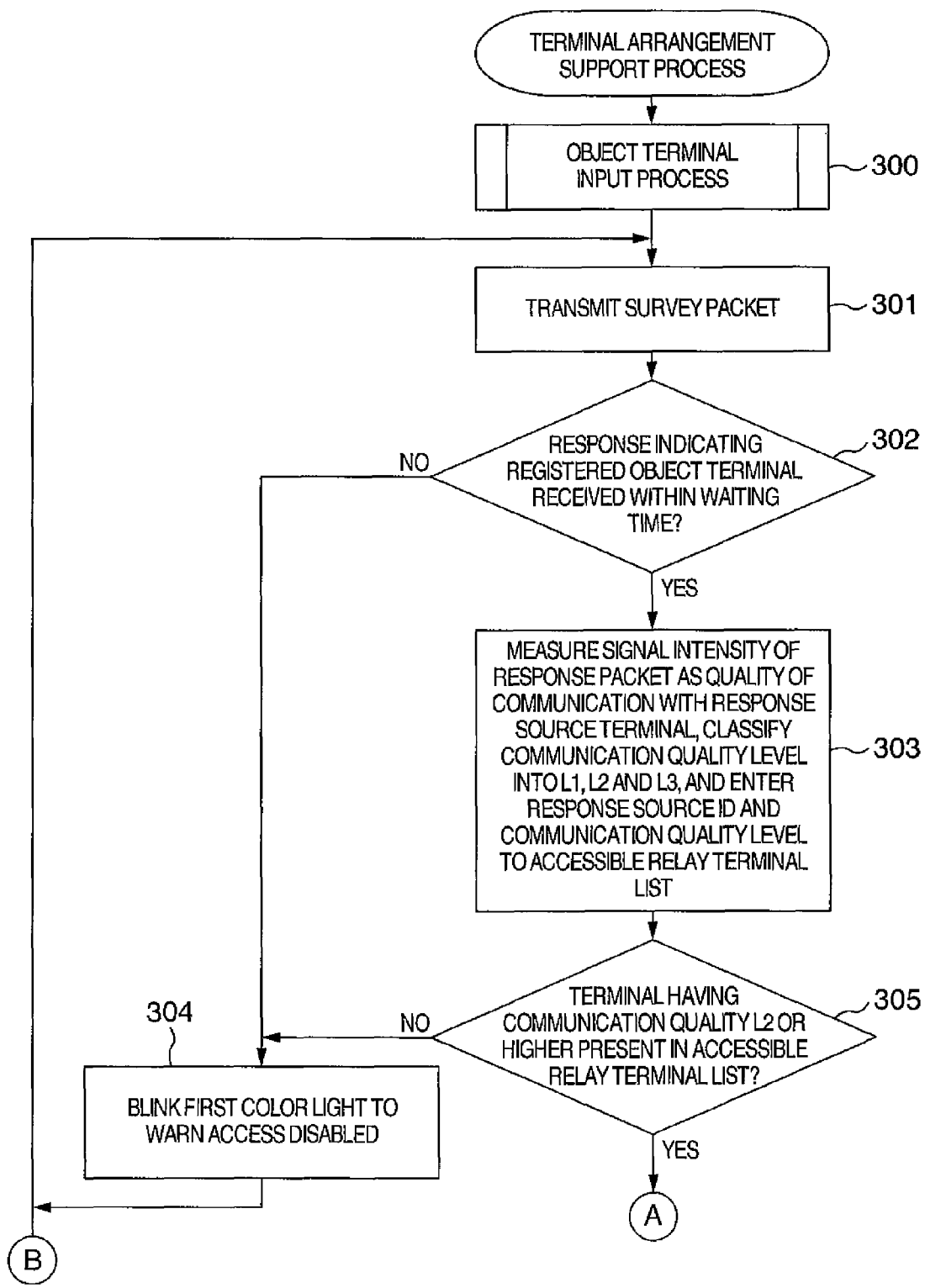
FIG. 4 is a flowchart exemplifying the arrangement support function of a relay terminal according to the embodiment.
Figure 5:
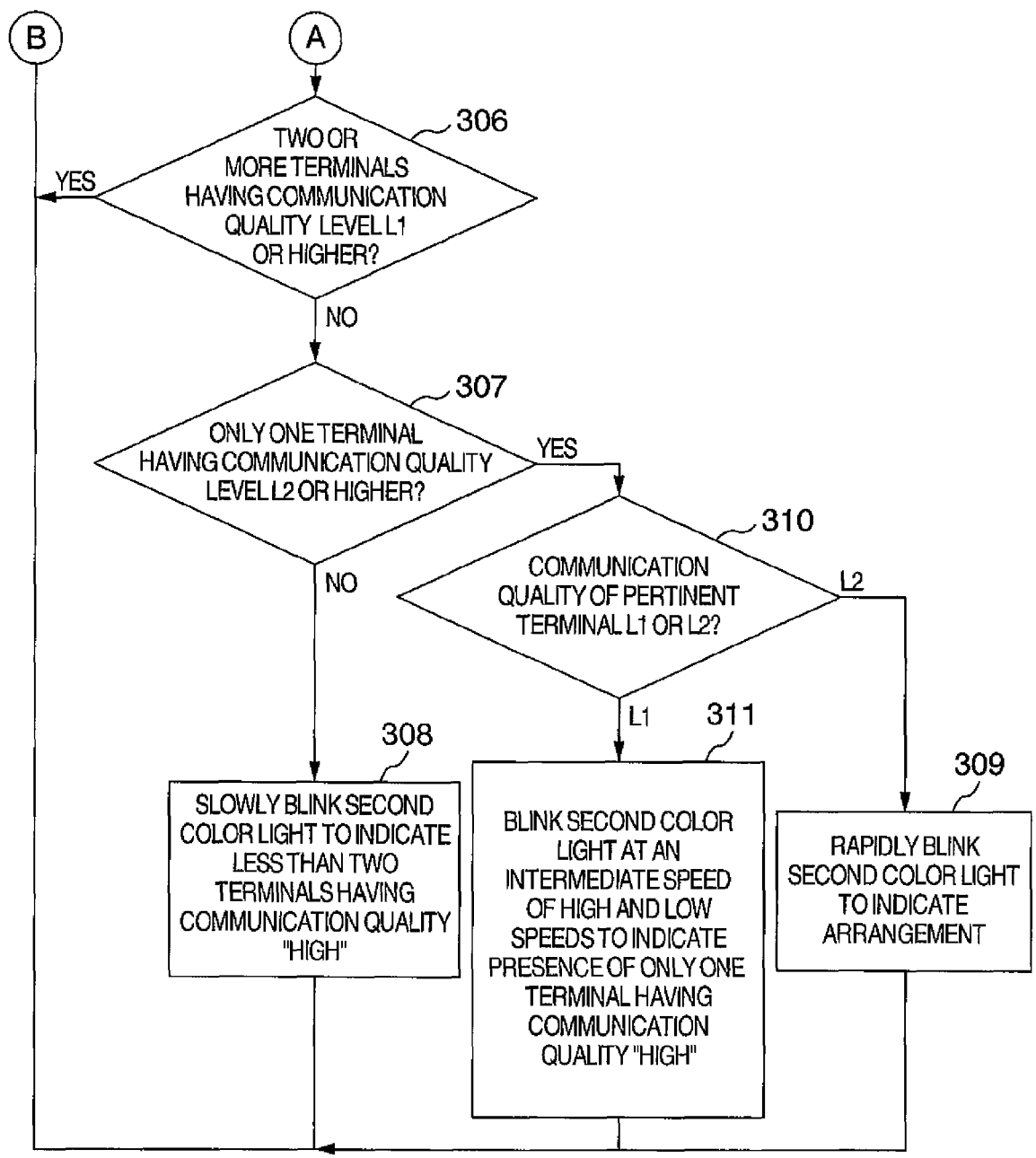
FIG. 5 is a flowchart exemplifying the arrangement support function of the relay terminal according to the embodiment.

The terminal arrangement support function of the relay terminal will be explained while referring to the flowcharts in FIGS. 4 and 5 showing the terminal arrangement support function. A communication object terminal (hereinafter referred to as an object terminal), which is the starting point for the expansion of a radio network, is registered with a relay terminal (e.g., 101) that has been shifted to the terminal arrangement support state. The object terminal in this embodiment is the communication terminal 105 in FIG. 1.

The relay terminal 101, which is in the terminal arrangement support state, performs the object terminal entry acceptance process (300). The object terminal may be designated in advance for the relay terminal 101.

Figure 6:
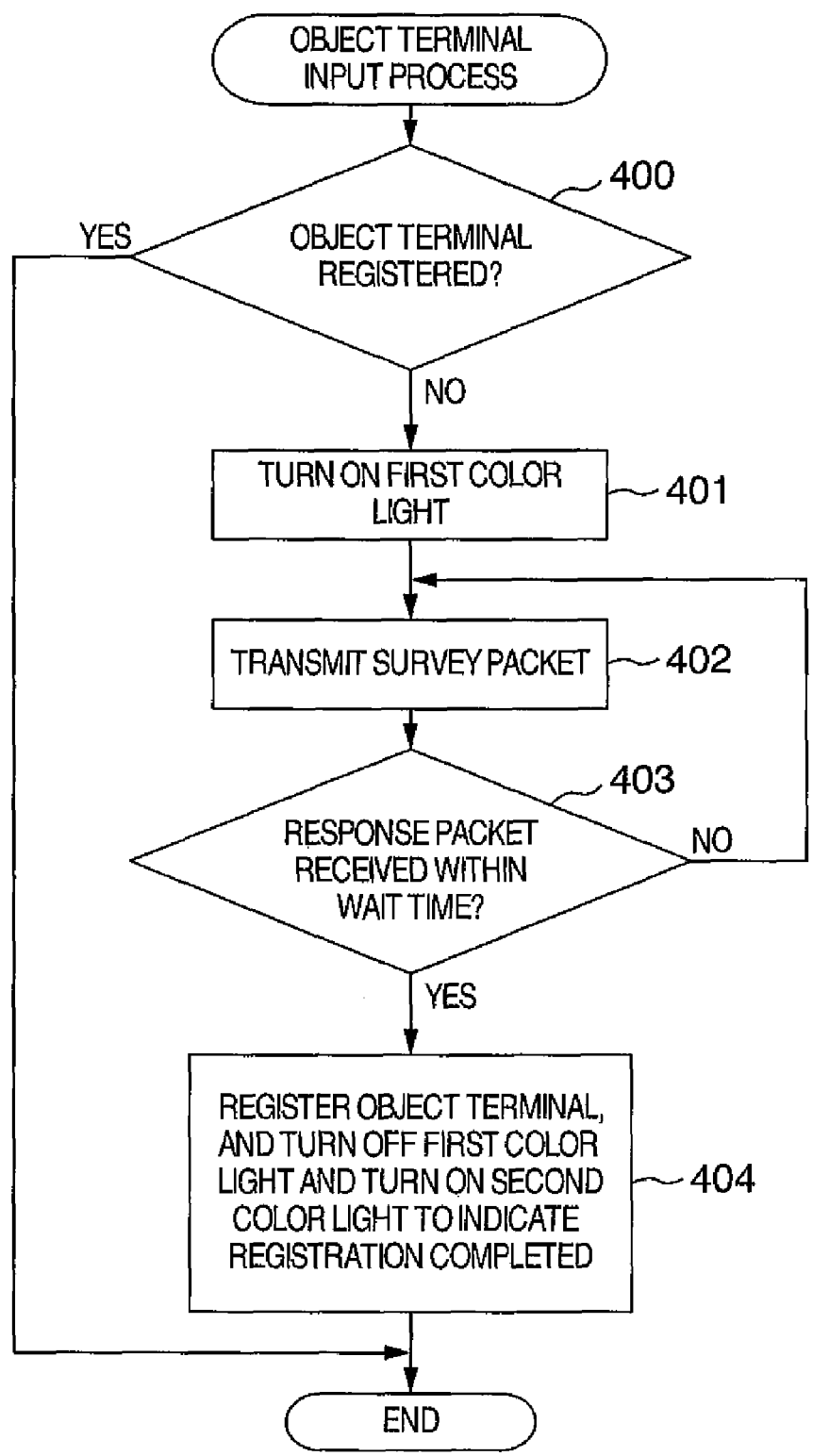
FIG. 6 exemplifies the detail flowchart of the object terminal input subroutine shown in FIG. 4.

The object terminal entry acceptance process (300) is shown in the flowchart in FIG. 6.

The relay terminal 101 performs a process (400) to determine whether the object terminal has been registered. When the object terminal has been registered, the relay terminal 101 advances to the next process without performing any intervening processes. When the object terminal has not been registered, the red lighting process (401), for example, is performed to indicate that the relay terminal 101 is in the terminal arrangement support state and that the object terminal has not yet been registered. In order to register the object terminal, the relay terminal 101 performs a survey packet transmission process (402). In this case, survey packets are broadcast to all the terminals within the radio communication range of the relay terminal 101.

The format for a survey packet is as shown in FIG. 7.

The format includes a packet type 500, an object terminal ID 501 and the ID 502 of the relay terminal 101 at the packet transmission source. A special ID (e.g., 0) is entered for an object terminal so that the object terminal for the relay terminal 101 is not yet registered. When the timer F00 is started following the transmission of a survey packet and a wait time has elapsed, it is assumed that a response packet has not been received and program control returns to the survey packet transmission process (402). When a response packet is received within the wait time, the object terminal is registered, and the light-emitting unit F03 performs a process (404) for changing from the red to a second light color, such as green.

The supervisory person 106 confirms that the color of the light emitted by the light-emitting unit F03 has been changed from red to green, and goes toward the supervisory target 104.

Next, the survey packet transmission process (301) is performed to determine the location.

A check is performed to determine whether a response to the survey packet has been received within a wait time. When no response has been received (no at 302), a blinking red light is emitted (304), indicating that communication with the object terminal is disabled. Program control thereafter returns to the survey packet transmission process (301). At this time, since communication with the object terminal 105 is disabled, the supervisory person 106 begins to return to the supervisory hub 100.

A warning sound may be produced when a light is blinking. When a response is received (yes at 302), the signal intensity of the response packet is measured, the communication quality level is determined based on a reference value defined in advance, and the communication quality level and the response source ID are entered in an accessible relay terminal list (303).

In this embodiment, two reference values are designated. Communication quality L1 is defined as being higher than a reference value indicated by the circle 201 in FIG. 2; communication quality L2 is defined as being lower than the reference value indicated by the circle 201 and higher than a reference value indicated by the circle 200; and communication quality L3 is defined for all other cases. Instead of the signal intensity, a signal-to-noise ratio may be employed as the reference for the communication quality.

An example accessible relay terminal list is shown in FIG. 8. In this embodiment, when the location of the supervisory person 106 is between the relay terminals 101 and 102, as is shown in FIG. 3, the ID of the relay terminal 101 is registered in a block 700, the quality of communication with the relay terminal 101 is registered in a block 705, the ID of the relay terminal 102 is registered in a block 701, and the quality of communication with the relay terminal 102 is registered in a block 706. Further, on the accessible relay terminal list, the ID of the terminal that has received a response is registered in a column 703, and the quality of communication with this terminal is registered in a column 704, aligned with the ID column 703.

The process for determining whether the location of the terminal is appropriate will now be explained while referring to FIGS. 1, 4 and 5.

A check is performed to determine whether a terminal, for which the communication quality is L2, is registered on the accessible relay terminal list. When the terminal has not yet been registered (no at 305), a blinking red light is emitted (304), indicating that communication with the object terminal is disabled, and program control returns to the survey packet transmission process (301). The supervisory person 106 identifies the disable communication by confirming the red light is blinking, and begins to return to the supervisory hub 100. When the terminal has been registered (yes at 305), a check is performed to determine whether at least two terminals for which the communication quality is L1 are present on the accessible relay terminal list (i.e., whether the location of the supervisory person 106 is within the range that is included in both the circles 201 and 202 of the relay terminals 101 and 102 in FIG. 3). When at least two terminals are present (yes at 306), program control returns to the survey packet transmission process (301). So long as the second color light is blinking, the supervisory person 106 continues to advance toward the supervisory target 104.

When two terminals for which the communication quality is L1 are not present (no at 306), a check is performed to determine whether only one terminal having a communication quality of L2 or higher is on the accessible relay terminal list. When there is only one terminal (e.g., only the relay terminal 102 in FIG. 1) (yes at 307), a check is performed to determine whether the communication quality level of the terminal is L1 or L2 (310). When the communication quality is L2, the second color light, i.e., a green light, is blinked at (309), and program control returns to the survey packet transmission process (301). When the communication quality is L1, the green light blinks slower than it does at (309) (311).

When no terminal has a communication quality of L2 or higher (no at 307), the green light blinks slower than it does at (311) (308), and program control returns to the survey packet transmission process (301). During the processes 309 and 308, a warning sound may be intermittently generated at the same speed as that at which the light is blinking.

In order to prevent communication from being cut off due to the failure of a relay terminal, when the supervisory person 106 desires to arrange a relay terminal at a location accessible by at least two terminals, as shown in FIG. 3, the supervisory person 106 advances toward the supervisory target 104, and arranges the relay terminal 103 when the green light begins to blink slower during the process (308). Or when the supervisory person 106 desires to arrange a relay terminal at a location accessible by at least one terminal, as is shown in FIG. 1, the supervisory person 106 advances toward the supervisory target 104 until the green light starts blinking during the process (309), and arranges the relay terminal 103 when the green light starts blinking during the process (309). For this arrangement, the relay terminal 103 is set to the relay state by depressing the switch F08. The supervisory person 106 also employs this process when arranging the relay terminals.

Figure 9:
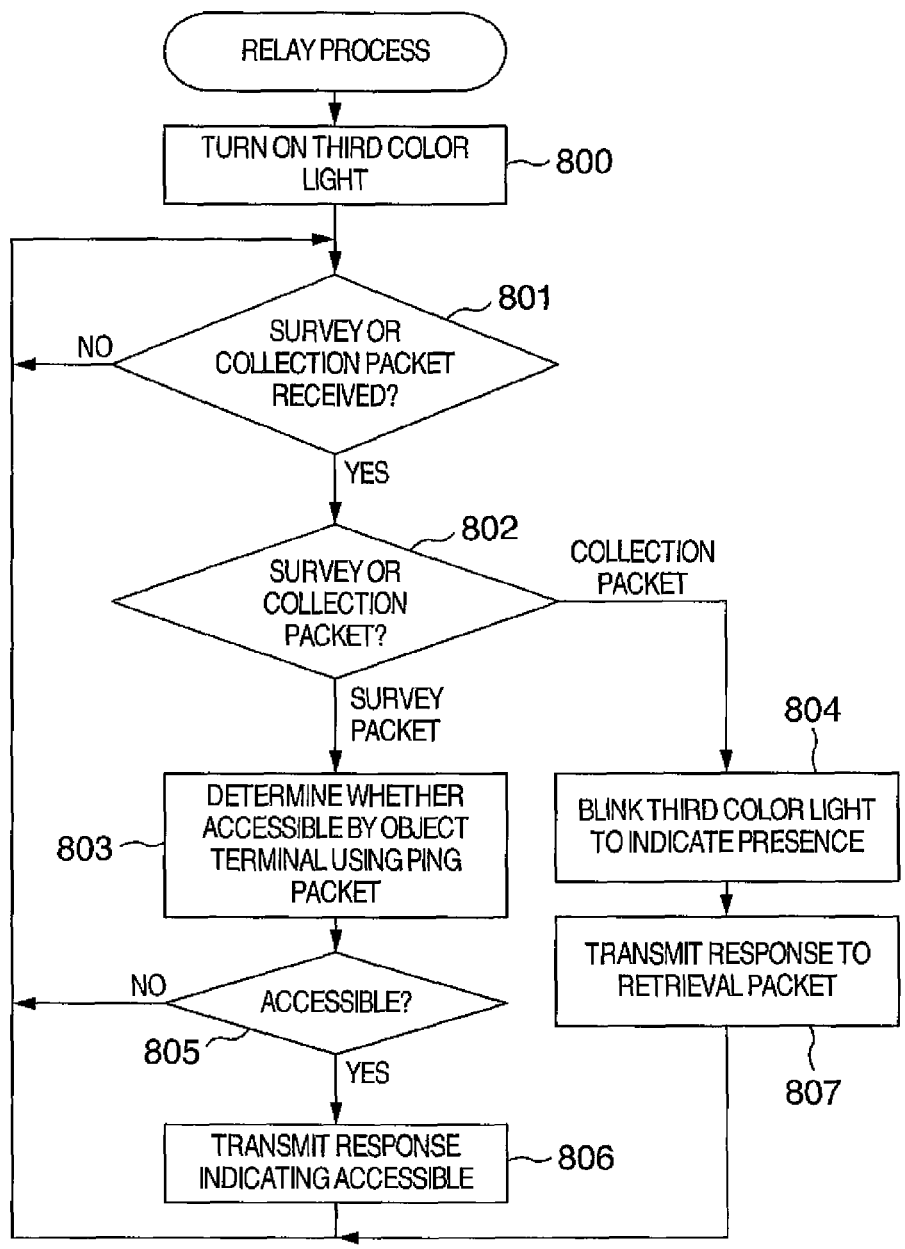
FIG. 9 is a flowchart exemplifying the relay processing according to the embodiment.

The relay function G01 of the relay terminal will now be described while referring to FIG. 9. FIG. 9 is an example flowchart showing the relay function G01 of a relay terminal.

The relay terminal 101, which is in the relay state, starts the route control software for controlling a communication route, and permits the light-emitting unit F03 to emit a light having a third color, such as blue (800). When a survey packet or a collection packet, which will be described later, is received (yes at 801), a check is performed to determine whether the received packet is a survey packet or a retrieval packet (802). When a retrieval packet is received, a blue light begins to blink (804). At the same time, sounds may also be generated. Then, a retrieval response packet is transmitted.

Figure 11:
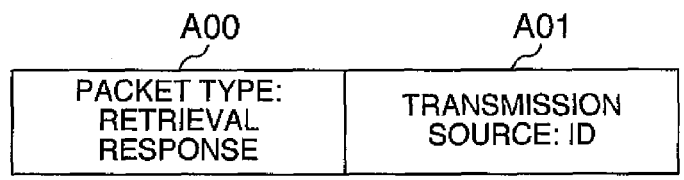
FIG. 11 is a diagram exemplifying the format of a retrieval response packet according to the embodiment.

The format of a retrieval response packet is shown in FIG. 11. This format includes a packet type A00 and the ID A01 of a packet transmission source.

When the packet received in the process 802 is a survey packet, the ID of the object terminal 105 included in the survey packet is examined to determine whether the object terminal 105 is accessible using a ping packet (803). When the object terminal 105 is accessible (yes at 805), an accessible response is transmitted (806). When the object terminal 105 is not accessible (no at 805), program control returns to the process (801) where it waits for the next packet. During the determination process 803, a routing table may be examined to determine whether the object terminal 105 is registered.

Figure 10:
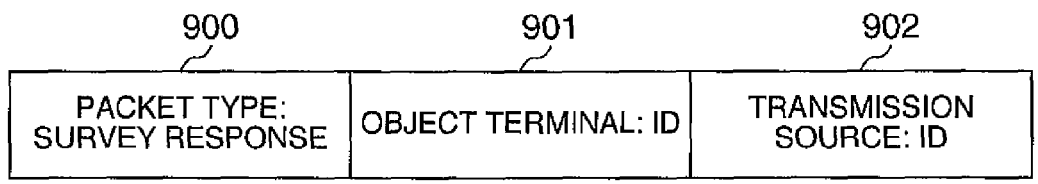
FIG. 10 is a diagram exemplifying the format of a survey response packet according to the embodiment.

The format of a survey response packet is shown in FIG. 10. This format includes a packet type 900, the ID 901 of the object terminal 105 and the ID 902 of the transmission source 101. When the relay terminal is shifted to a state other than the relay state, execution of the route control software is halted, terminating the route control process.

Figure 12:
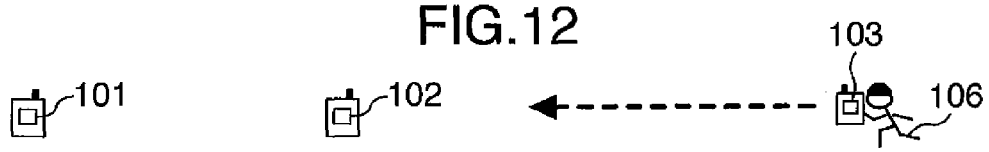
FIG. 12 is a diagram exemplifying the procedures of a retrieval operation according to the embodiment.

The terminal retrieval support function of the relay terminal will now be described. An example retrieval process is shown in FIG. 12. When the supervisory person 106 retrieves the relay terminals 101 and 102 that have been arranged, the relay terminal 103 is set to the terminal retrieval support state to notify the supervisory person 106 that the terminals are present, so that the retrieval of the relay terminals can be supported.

Figure 13:
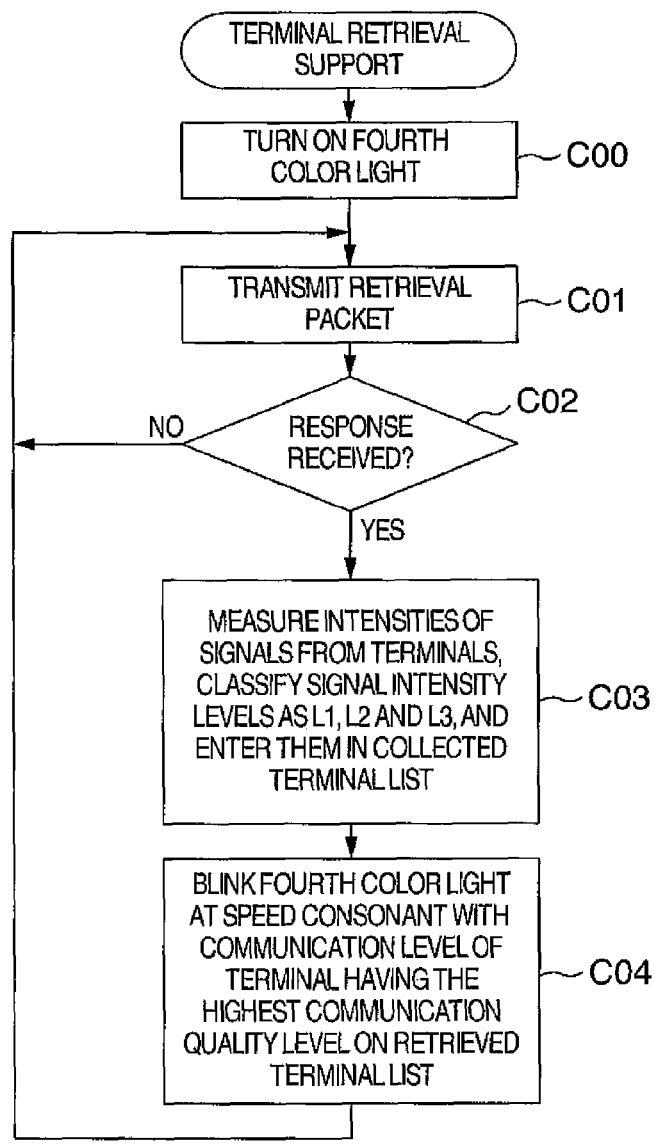
FIG. 13 is a flowchart exemplifying a terminal retrieval support function according to the embodiment.

FIG. 13 is an example flowchart for the terminal retrieval support function. When the relay terminal 103 is set to the terminal retrieval support state, the relay terminal 103 permits the light-emitting unit F03 to emit a light having a fourth color, such as yellow (C00). Then, a collection packet is transmitted (C01), and when a response to this packet is not received (no at C02), program control returns to the retrieval packet transmission process (C01).

When a response is received (yes at C02), the signal intensity of the response packet is measured, the communication quality level is determined, and the response source ID and the communication quality level are entered in a retrieved terminal list (C03). Instead of the signal intensity, a signal-to-noise ratio may be employed as the communication quality. Further, the same reference as in the process 303, or another reference value, may be employed to determine the communication quality level. Furthermore, the fourth color light, i.e., the yellow light, blinks at the speed that is consonant with the terminal that is registered on the collected terminal list and that has the highest communication quality level (C04). In this embodiment, since three communication quality levels, L1, L2 and L3, are provided, a high blinking speed may be set for the communication quality L1, an intermediate speed may be set for the communication quality L2 and a low speed may be set for the communication quality L3. In addition, instead of, or at the same time as the blinking of light, sounds may be generated. At this time, the pitch and the volume of a tone may be changed in accordance with the communication quality level.

Figure 14:
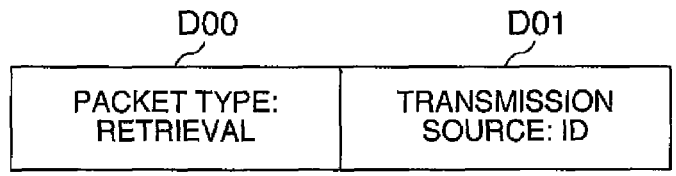
FIG. 14 is a diagram exemplifying the format of a retrieval packet according to the embodiment.
Figure 15:
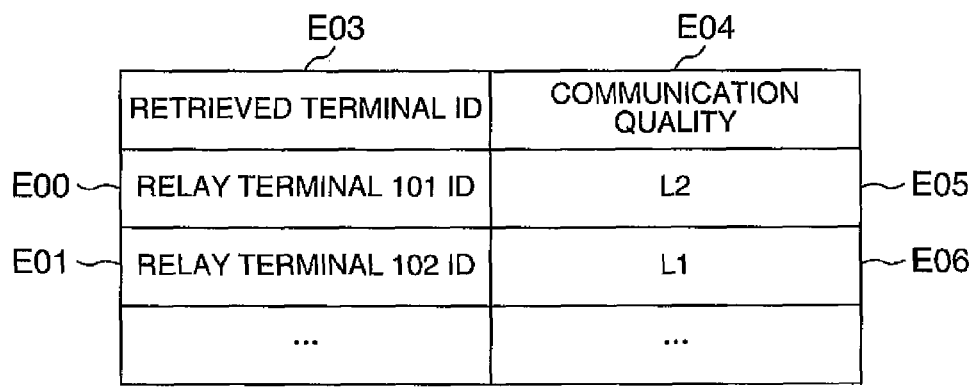
FIG. 15 is a diagram exemplifying a retrieved terminal list according to the embodiment.

An example format for the retrieval packet is shown in FIG. 14. This format includes a packet type D00 and the ID D01 of a packet transmission source. An example retrieved terminal list is shown in FIG. 15. In this embodiment, the ID of the terminal 101 is entered in a block E00; the quality of the communication with the terminal 101 is entered in a block E05; the ID of the terminal 102 is entered in a block E01; and the quality of the communication with the terminal 102 is entered in a block E06. Further, in the retrieved terminal list, the ID of a retrieved terminal is entered in a column E03, and the quality of the communication with the retrieved terminal is entered in a column E04 aligned with the ID column E03.

The supervisory person 106 in charge of the retrieval of relay terminals confirms that a light is blinking on his or her relay terminal 103, which is in the terminal retrieval support state, and from this can ascertain that the terminal 101 or 102 to be retrieved is located nearby. At this time, since it can be determined that the relay terminal 101 or 102 is located nearby when the communication quality level is high, the distance to the relay terminal can be estimated when the light is blinking rapidly. And after the supervisory person 106 enters the radio communication range and a light on the relay terminal 101 or 102 blinks or sounds are generated through the process 804 in FIG. 9, the supervisory person 106, using the light or the sounds, and easily divine the location of the relay terminal 101 or 102.

Figure 18:
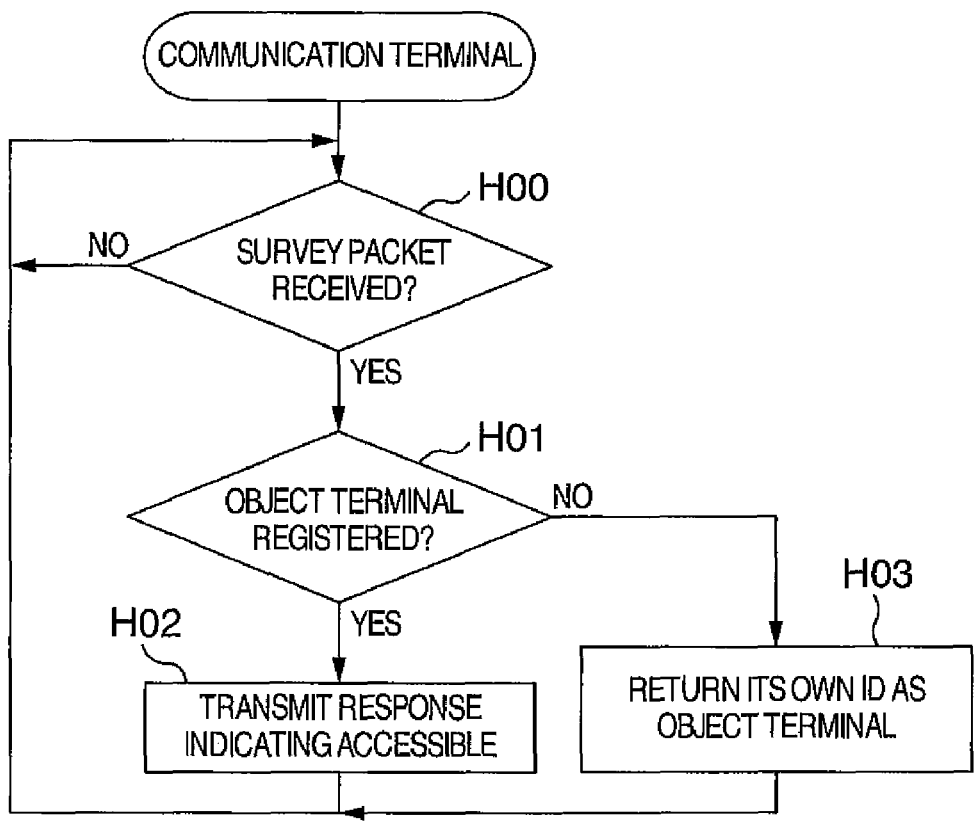
FIG. 18 is a flowchart exemplifying a communication terminal function according to the embodiment.

An example flowchart for the communication terminal 105 is shown in FIG. 18. When a survey packet is received via the relay terminal (e.g., 101) (yes at H00), a check is performed to determine whether the object terminal ID 901 included in the survey packet has not yet been registered. When the object terminal ID 901 has not yet been registered (no at H01), the ID of the communication terminal (e.g., 105) is entered as the object terminal ID 901 for the survey packet to indicate that the pertinent communication terminal is an object terminal, the response is transmitted to the relay terminal 101 (H03), and the arrival of the next packet is waited for.

When the object terminal indicated by the survey packet matches the communication terminal 105 (yes at H01), a response indicating that it is accessible is returned (H02), and the arrival of the next packet is waited for. The format of the survey response packet is as shown in FIG. 10.

According to this embodiment, for the expansion of a radio network, the relay terminals can be arranged without a radio status survey being performed.

Further, for the retrieval of arranged relay terminals, the presence of peripheral relay terminals can be detected.

Furthermore, since the arrangement support function, the relay function for communications with a communication terminal, and the retrieval support function can be switched, a single terminal can perform the arrangement support function, the relay function and the retrieval support function.

The use of colors and the manner in which blinking lights are employed in this embodiment are merely examples, and other ways may be employed so long as the individual states can be identified. Further, means other than light and sounds may be employed.

The specification and drawings are, accordingly, to be regarded in an illustrative rather than a restrictive sense. It will, however, be evident that various modifications and changes may be made thereto without departing from the spirit and scope of the invention as set forth in the claims.

The invention claimed is:

1. A radio expansion method for expanding a radio network having a plurality of communication terminals using at least one relay terminal which receives and transmits data transmitted or received by the communication terminals, the method comprising steps of:
   providing an arrangement support function for a first said relay terminal;
   transmitting, by the arrangement support function, a survey packet to other said relay terminals or one of the communication terminals from a current location of the first relay terminal using a radio communication unit of the first relay terminal;
   measuring, by the arrangement support function, a communication quality of a survey response packet transmitted by the other relay terminal or the communication terminal in response to the survey packet;
   evaluating, by the arrangement support function, whether or not the current location is appropriate for the first relay terminal according to the measured communication quality; and
   providing, as a result of the evaluating, an indication by the arrangement support function of the first relay terminal as to whether the current location is appropriate,
   wherein, in the evaluating step, the appropriate location is a location where the first relay terminal can communicate with one of:
   at least two communication terminals,
   at least two other relay terminals, and
   at least one communication terminal and at least one other relay terminal,
   within a predetermined range of the communication quality.

2. The radio network expansion method according to claim 1, wherein, in the communication quality measuring step, a field intensity of signals of the survey response packet is measured when the first relay terminal receives the survey response packet.

3. The radio network expansion method according to claim 1, wherein, in the communication quality measuring step, a signal-to-noise rate of signals of the survey response packet is measured when the first relay terminal receives the survey response packet.

4. The radio network expansion method according to claim 1, wherein the appropriate location is determined based on a field intensity or a signal-to-noise ratio of received single.

5. The radio network expansion method according to claim 1, further comprising the steps of:
   providing a retrieval support function for the first relay terminal;
   transmitting, by the arrangement support function, a retrieval packet to other relay terminals from the current location of the first relay terminal using the radio communication unit;
   measuring, by the retrieval support function, a communication quality of a retrieval response packet transmitted in response to the retrieval packet, the communication quality indicating a distance to the other relay terminal to be retrieved; and
   indicating, by the retrieval support function of the first relay terminal, a result of the measuring of the communication quality.

6. The radio network expansion method according to claim 5, further comprising a step of:
   transmitting, by a relay function of the other relay terminal which receives the retrieval packet, a retrieval response packet in response to receipt of the retrieval packet.

7. The radio network expansion method according to claim 6, wherein the first relay terminal transits among modes for performing the arrangement support function, the retrieval support function, and the relay function.

8. The-radio network expansion method according to claim 7, wherein the first relay terminal notifies a user of the first relay terminal of the current mode and the arranged location of the first relay terminal.

9. The radio network expansion method according to claim 8, wherein the first relay terminal notifies the user of the relay terminal of the current mode and the arranged location using a sound and/or color of light.

10. The radio network expansion method according to claim 1, wherein the first relay terminal notifies a user of the communication terminal of a presence of the first relay terminal.

\* \* \* \* \*